(12) United States Patent
Hoffart

(10) Patent No.: US 6,422,322 B1
(45) Date of Patent: Jul. 23, 2002

(54) CONNECTOR ASSEMBLY FOR THREE-POINT HITCH

(76) Inventor: Ronald J. Hoffart, 755 2nd Ave. NW., West Fargo, ND (US) 58078

( * ) Notice: Subject to any disclaimer, the term of this patent is extended or adjusted under 35 U.S.C. 154(b) by 0 days.

(21) Appl. No.: 09/696,342

(22) Filed: Oct. 24, 2000

(51) Int. Cl.⁷ .............................................. A01B 51/00
(52) U.S. Cl. ....................................... 172/439; 172/272
(58) Field of Search ................................ 172/272, 275, 172/439, 443, 444; 280/507, 508, 510, 512, 515

(56) References Cited

U.S. PATENT DOCUMENTS 4,398,745 A * 8/1983 Azzarello et al. ........... 280/508
5,497,835 A * 3/1996 Laubner et al. ............. 172/272

* cited by examiner

Primary Examiner—Robert E. Pezzuto
(74) Attorney, Agent, or Firm—Michael S. Neustel

(57) ABSTRACT

A connector assembly for three-point hitch for conveniently receiving and securing the hitch of an implement to a three-point hitch. The connector assembly for three-point hitch includes a claw member having a receiver groove, and a locking lever pivotally attached to the claw member. The locking lever includes a handle, a front edge and a locking edge, wherein the locking edge engages and retains a connecting shaft within the receiver groove during operation. The front edge of the locking lever is engaged by the connecting shaft during insertion thereby moving the locking lever into an open position allowing free insertion of the connecting shaft into the receiver groove. An aperture within the claw member and the locking lever allows the insertion of a securing pin to ensure the locking lever retains the connecting shaft within the receiver groove during operation of the implement.

9 Claims, 13 Drawing Sheets

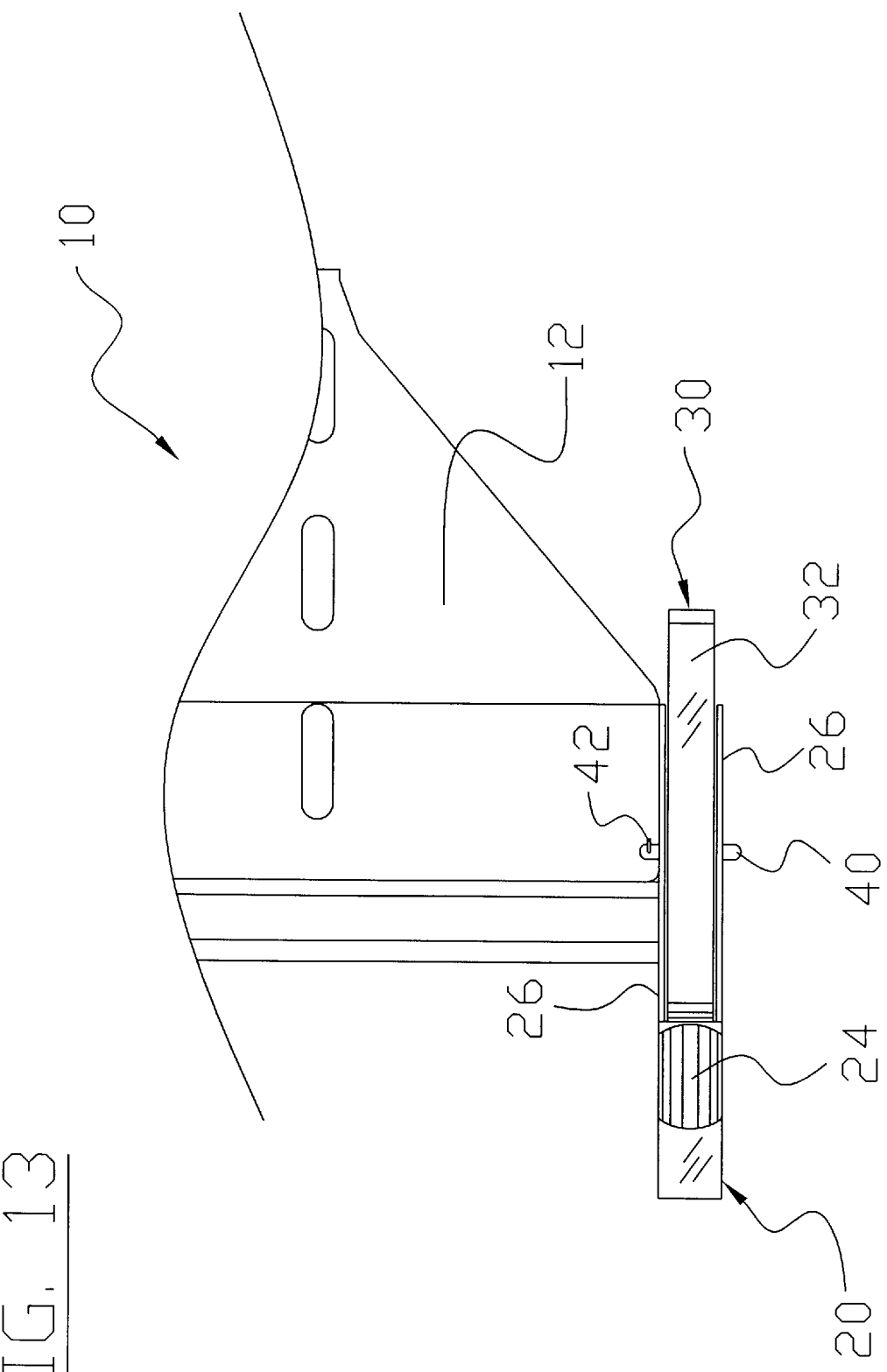

CONNECTOR ASSEMBLY FOR THREE-POINT HITCH

BACKGROUND OF THE INVENTION

1. Field of the Invention

The present invention relates generally to three-point hitches and more specifically it relates to a connector assembly for three-point hitch for conveniently receiving and securing the hitch of an implement to a three-point hitch.

2. Description of the Prior Art

Conventional three-point hitches have been in use for years on tractors and other vehicles. Three-point hitches can be removably engaged to various types of implements such as plows, seeders, hay bale movers and various other implements. Typical three-point hitches utilize a relatively complex connecting structure for receiving and securing the hitch of an implement. Connecting conventional three-point hitches can be time consuming to utilize and operate.

While these devices may be suitable for the particular purpose to which they address, they are not as suitable for conveniently receiving and securing the hitch of an implement to a three-point hitch. Conventional three-point hitches utilize relatively complex connecting structures that require significant amounts of labor to operate and are often times cumbersome to operate.

In these respects, the connector assembly for three-point hitch according to the present invention substantially departs from the conventional concepts and designs of the prior art, and in so doing provides an apparatus primarily developed for the purpose of conveniently receiving and securing the hitch of an implement to a three-point hitch.

SUMMARY OF THE INVENTION

In view of the foregoing disadvantages inherent in the known types of three-point hitches now present in the prior art, the present invention provides a new connector assembly for three-point hitch construction wherein the same can be utilized for conveniently receiving and securing the hitch of an implement to a three-point hitch.

The general purpose of the present invention, which will be described subsequently in greater detail, is to provide a new connector assembly for three-point hitch that has many of the advantages of the three-point hitches mentioned heretofore and many novel features that result in a new connector assembly for three-point hitch which is not anticipated, rendered obvious, suggested, or even implied by any of the prior art three-point hitches, either alone or in any combination thereof.

To attain this, the present invention generally comprises a claw member having a receiver groove, and a locking lever pivotally attached to the claw member. The locking lever includes a handle, a front edge and a locking edge, wherein the locking edge engages and retains a connecting shaft within the receiver groove during operation. The front edge of the locking lever is engaged by the connecting shaft during insertion thereby moving the locking lever into an open position allowing free insertion of the connecting shaft into the receiver groove. An aperture within the claw member and the locking lever allows the insertion of a securing pin to ensure the locking lever retains the connecting shaft within the receiver groove during operation of the implement.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a connector assembly for three-point hitch that will overcome the shortcomings of the prior art devices.

A second object is to provide a connector assembly for three-point hitch for conveniently receiving and securing the hitch of an implement to a three-point hitch.

Another object is to provide a connector assembly for three-point hitch that reduces the amount of time and effort required to connect the hitch of an implement to a three-point hitch of a tractor.

An additional object is to provide a connector assembly for three-point hitch that is simple to operate.

A further object is to provide a connector assembly for three-point hitch that automatically receives and secures the hitch of an implement.

Another object is to provide a connector assembly for three-point hitch that utilizes few moving components.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 13 is a top view of the present invention with the locking lever in the open position.

DESCRIPTION OF THE PREFERRED EMBODIMENT

Figure 1:
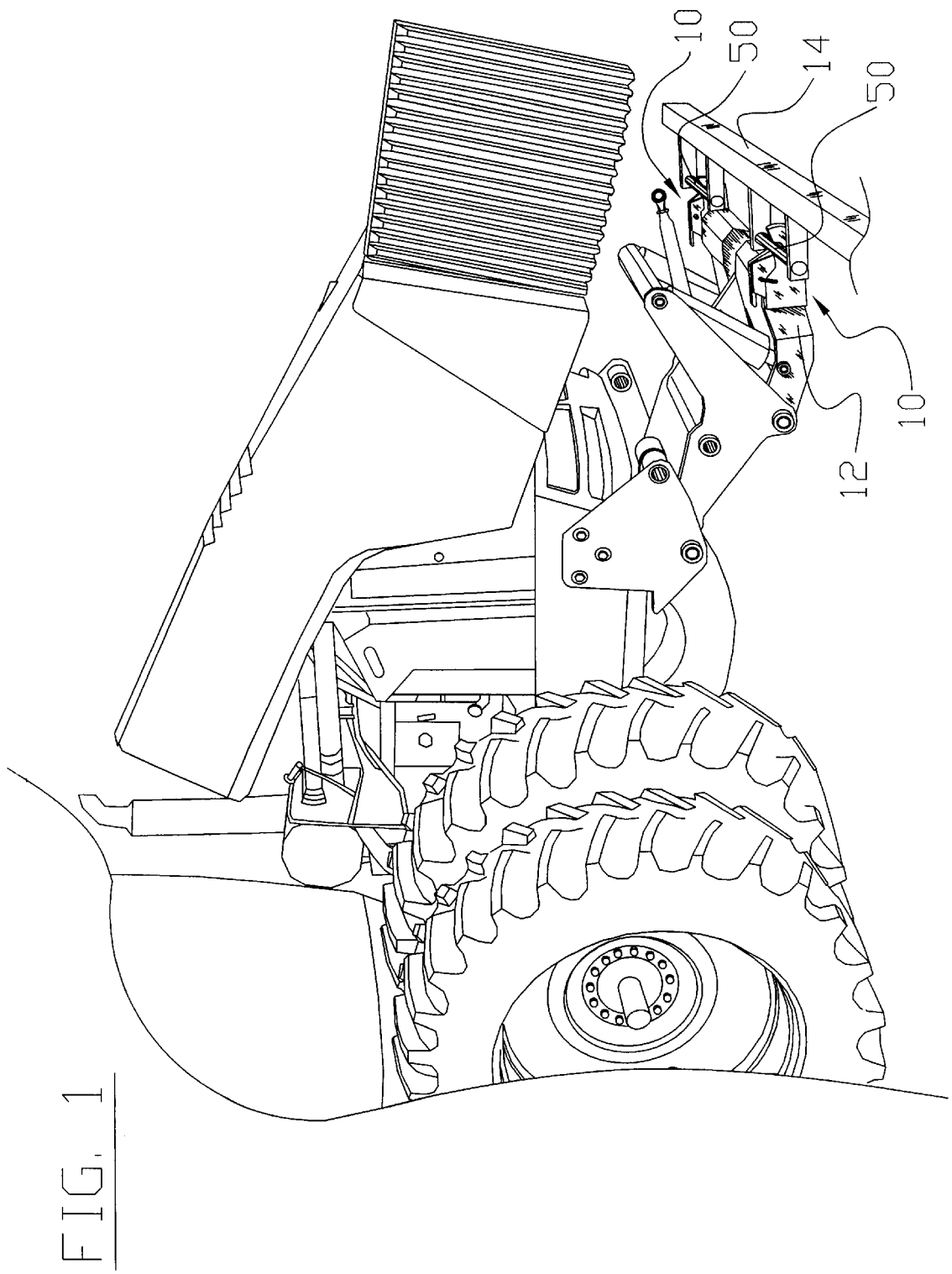
FIG. 1 is an upper perspective view of the present invention positioned upon a three-point hitch and receiving a hitch from an implement.

Turning now descriptively to the drawings, in which similar reference characters denote similar elements throughout the several views, FIGS. 1 through 13 illustrate a connector assembly for three-point hitch 10, which comprises a claw member 20 having a receiver groove 24, and a locking lever 30 pivotally attached to the claw member 20. The locking lever 30 includes a handle 32, a front edge 37 and a locking edge 36, wherein the locking edge 36 engages and retains a connecting shaft 50 within the receiver groove 24 during operation. The front edge 37 of the locking lever 30 is engaged by the connecting shaft 50 during insertion thereby moving the locking lever 30 into an open position allowing free insertion of the connecting shaft 50 into the receiver groove 24. An aperture within the claw member 20 and the locking lever 30 allows the insertion of a securing pin 40 to ensure the locking lever 30 retains the connecting shaft 50 within the receiver groove 24 during operation of the implement.

Figure 2:
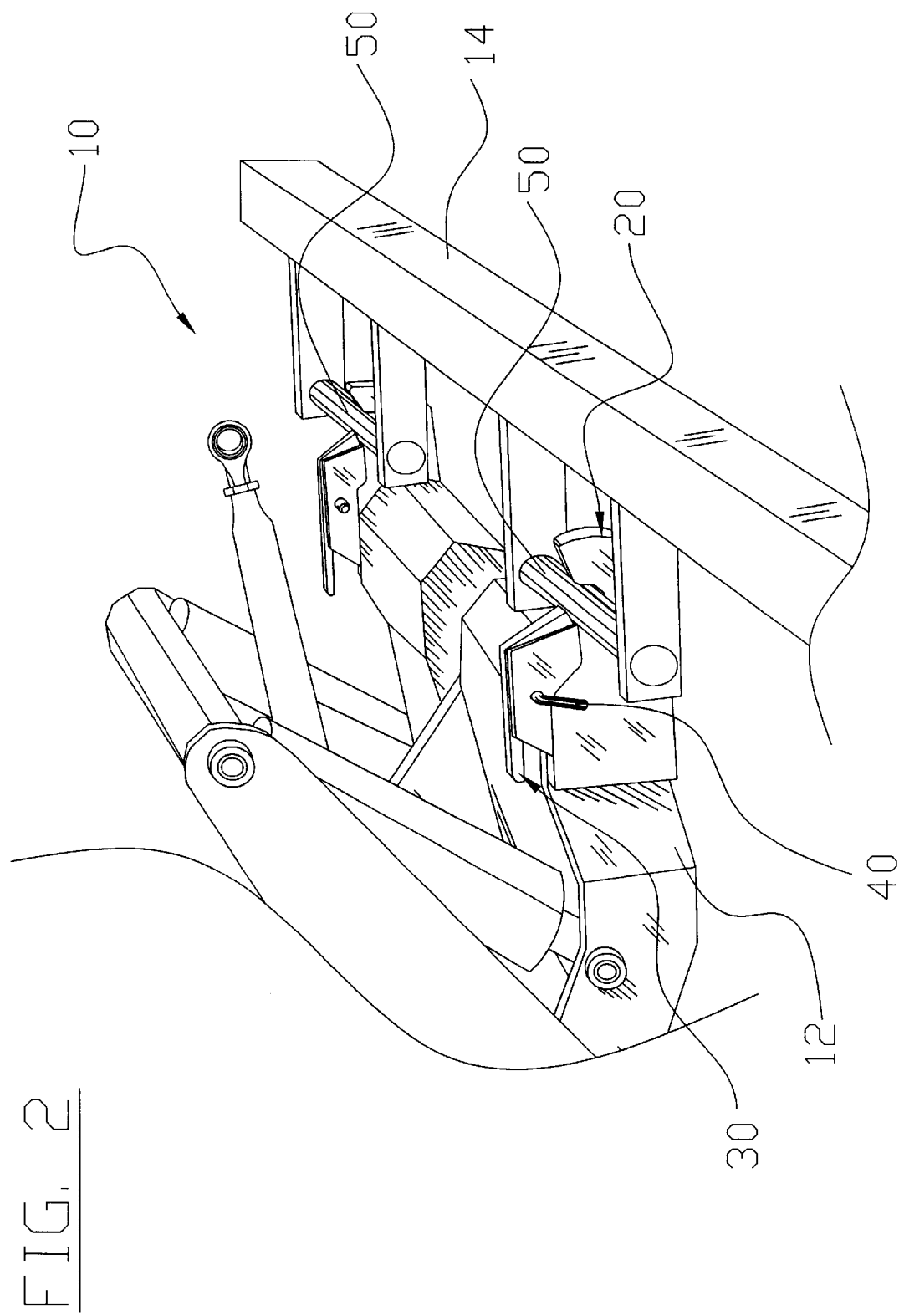
FIG. 2 is a magnified upper perspective view of the present invention receiving the hitch of an implement.

As shown in FIGS. 1 and 2 of the drawings, a typical three-point hitch includes a pair of lower support arms 12 and an upper center arm for engaging and supporting the hitch 14 of an implement. Three-point hitches may be attached to the front or rear of a tractor as is well-known in the art. The pair of lower support arms 12 have a connector assembly that receives a connecting shaft 50 or uniball 50. The connecting shaft 50 or uniball 50 are attached to the hitch 14 of the implement. If a uniball 50 is utilized, a connecting shaft 50 is positioned within an aperture of the uniball 50, wherein the uniball 50 allows rotational movement within the claw member 20 of the support arm 12. Further discussion of typical three-point hitches will not be continued since the same is deemed readily apparent from the prior art that exists. In addition, to simplify the discussion of the present invention which attaches to the pair of support arms 12, only one unit of the present invention will be discussed since an identical unit is simply utilized upon the opposing support arm 12 as clearly shown in FIGS. 1 and 2 of the drawings.

Figure 3:
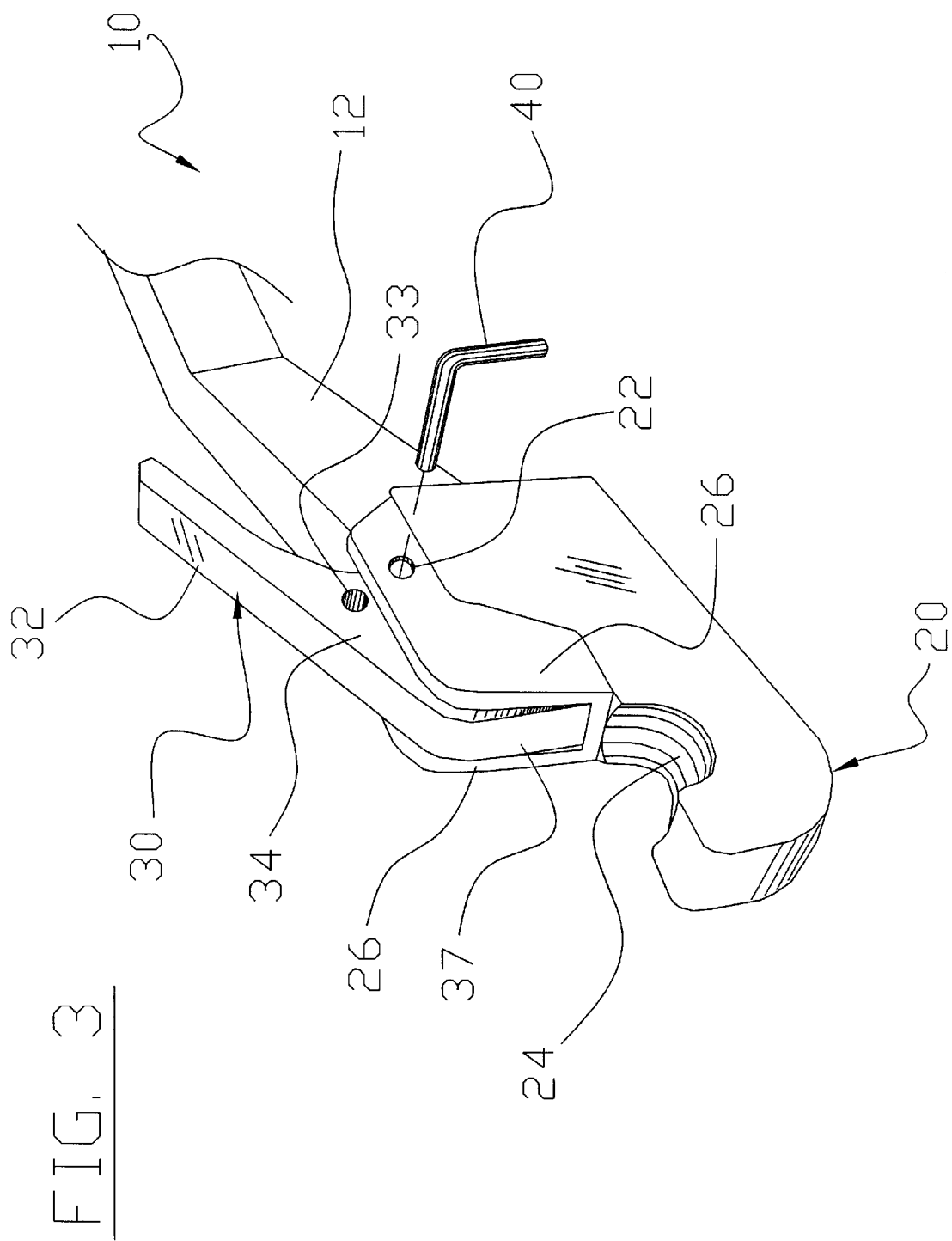
FIG. 3 is an upper perspective view of the present invention.
Figure 4:
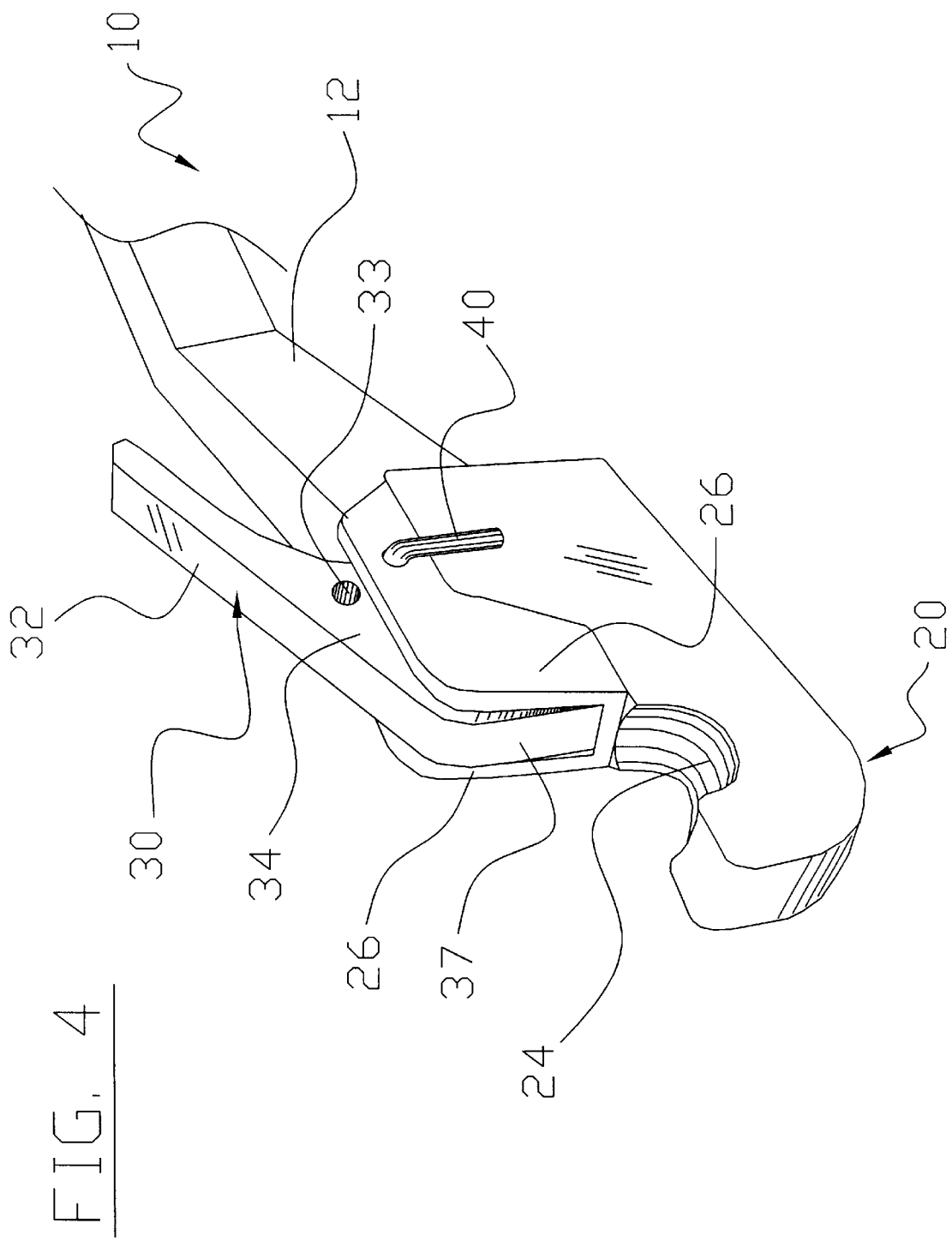
FIG. 4 is an upper perspective view of the present invention with the securing pin positioned to retain the locking lever in an open position thereby allowing release of the hitch of the implement.
Figure 5:
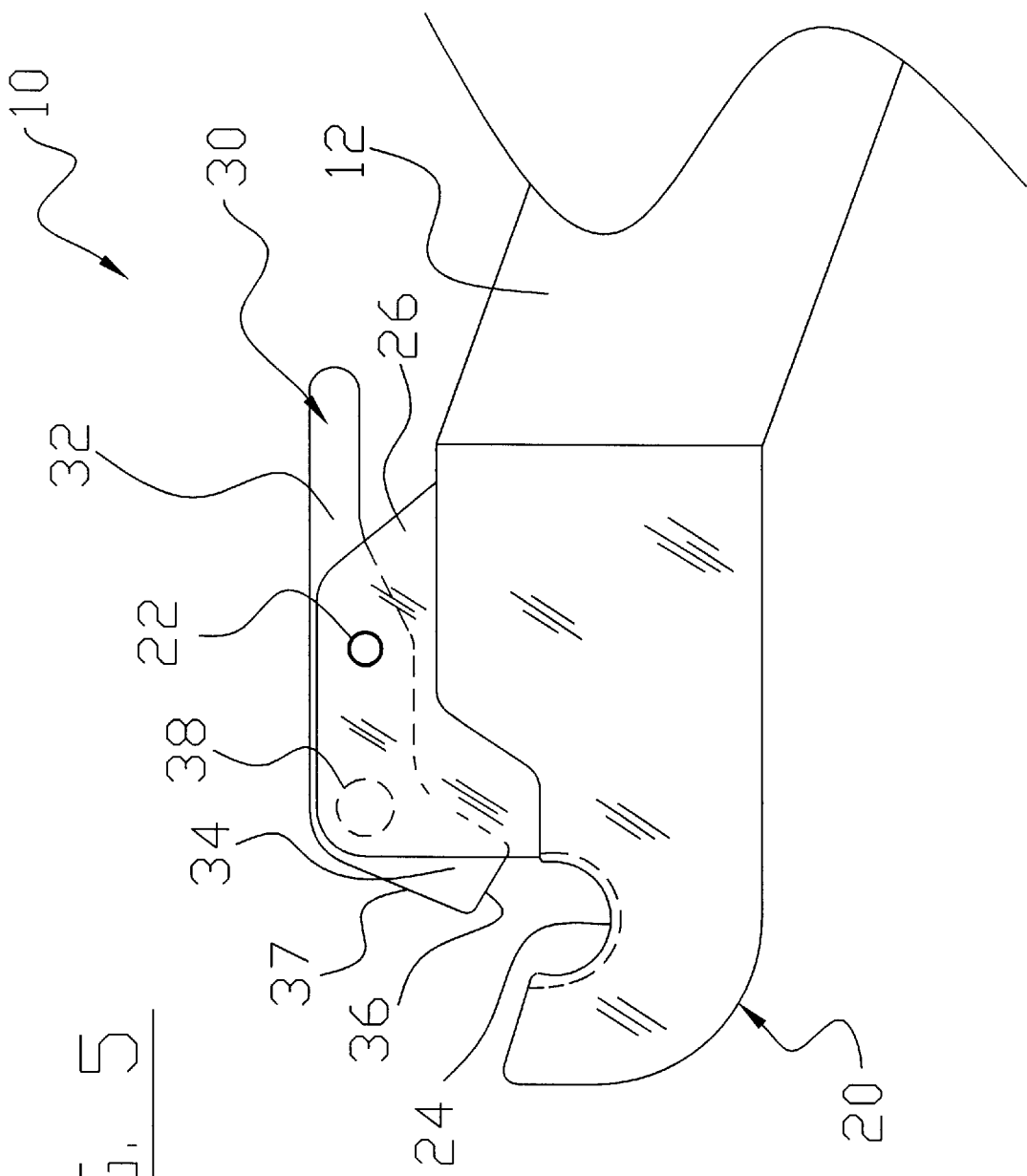
FIG. 5 is a side view of the present invention showing the locking lever in the closed position.
Figure 6:
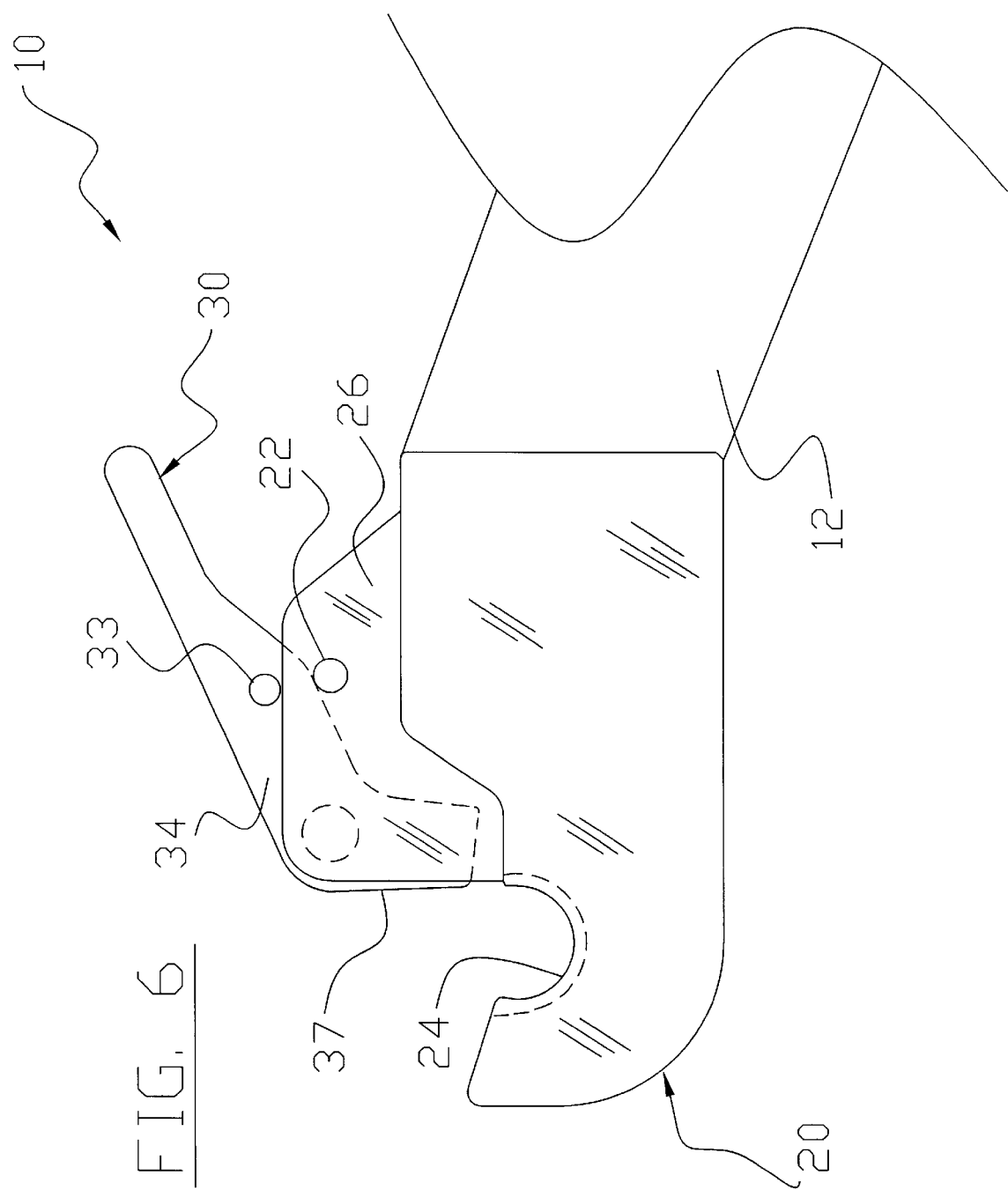
FIG. 6 is a side view of the present invention showing the locking lever in the open position.

As shown in FIGS. 1 through 9 of the drawings, the claw member 20 is attached to the support arm 12. The claw member 20 may have any shape and structure as can be appreciated. The claw member 20 includes a receiver groove 24 for receiving a connecting shaft 50 or a uniball 50 as shown in FIGS. 3 through 13 of the drawings. The receiver groove 24 may have a consistent shape for directly receiving a connecting shaft 50 or a semi-spherical shape for receiving a uniball 50. As best shown in FIGS. 5 through 9 of the drawings, the receiver groove 24 has a lower portion, a front portion, and a rear portion formed for receiving the connecting shaft 50 or uniball 50. The front portion and the rear portion are in opposition to one another as best shown in FIGS. 5 and 6 of the drawings.

As further shown in FIGS. 3 through 13 of the drawings, a support bracket 26 extends upwardly from the claw member 20 adjacent the rear portion of the receiver groove 24. The support bracket 26 may have various shapes, structures and designs. As best shown in FIGS. 3 and 4 of the drawings, the support bracket 26 preferably has a U-shaped structure with a slot within for pivotally receiving the locking lever 30. However, the support bracket 26 may also be comprised of a solid structure with the locking lever 30 pivotally attached about the support bracket 26 as can be appreciated. The structure of the claw member 20 and the support bracket 26 should not be limited by the illustrations shown in the figures.

As shown in FIGS. 3 through 9 of the drawings, the locking lever 30 is pivotally attached about the support bracket 26 of the claw member 20. The locking lever 30 is formed for securing the connecting shaft 50 (or uniball) within the receiver groove 24. The locking lever 30 may have various shapes, designs and structures that allow securing of the connecting shaft 50 (or uniball) within the receiver groove 24 of the claw member 20.

The locking lever 30 includes a body 34 pivotally attached to the support bracket 26 by a pivot pin 38, a handle 32 extending from the body 34 rearwardly away from the receiver groove 24, a front edge 37 having a vertically orientated surface opposite of the handle 32, and a locking edge 36 within the lower portion thereof substantially orthogonal to the front edge 37 as shown in FIGS. 5 through 9 of the drawings. The handle 32 may have any shape and structure that allows manual manipulation of the locking lever 30 by an individual. The handle 32 preferably extends away from the distal end of the claw member 20 and is orientated substantially horizontal as shown in FIGS. 5 through 9 of the drawings.

Figure 7:
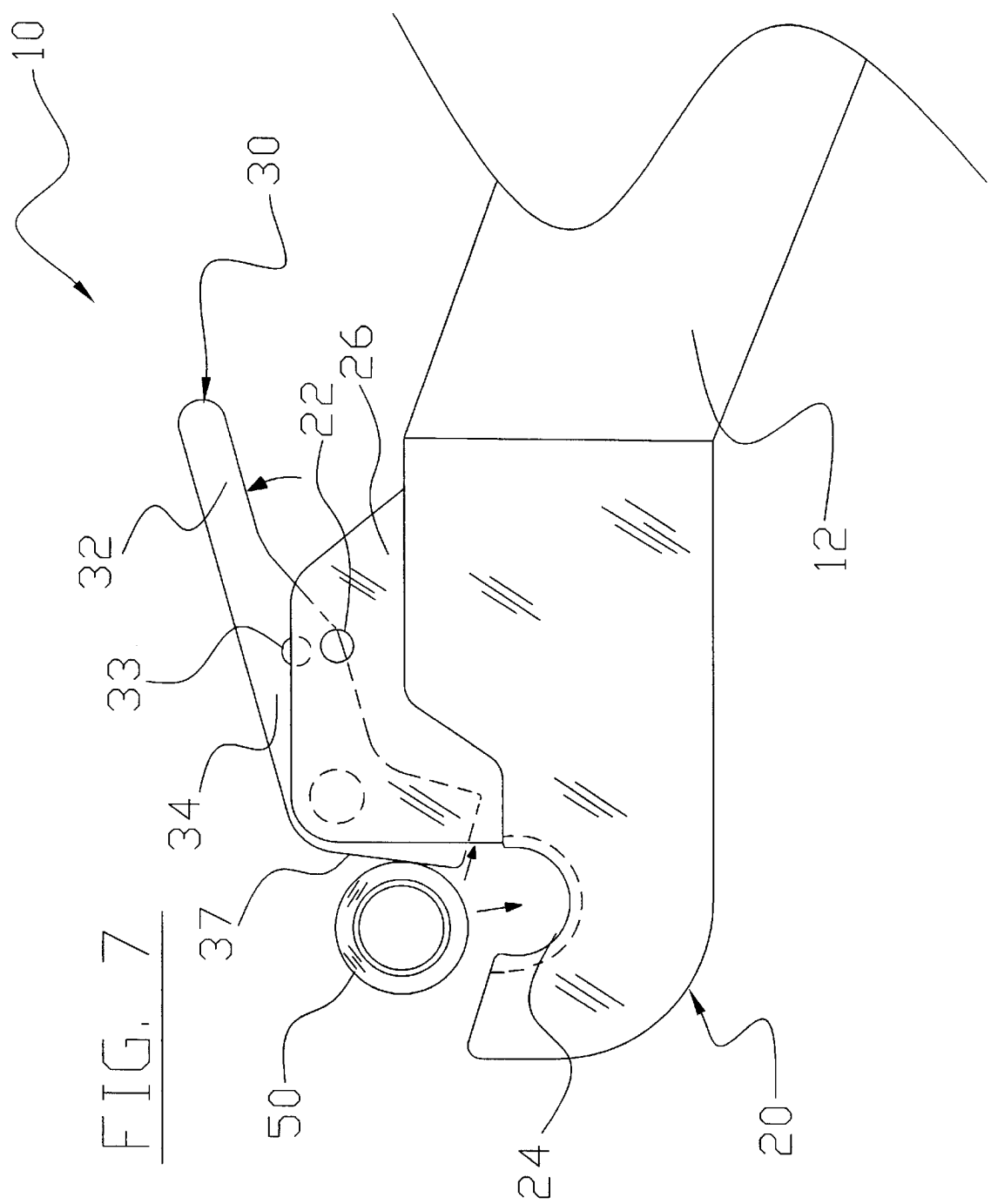
FIG. 7 is a side view of the present invention with a connecting shaft of the hitch of an implement partially inserted into the receiver groove and pushing the locking lever in a partially open position.
Figure 8:
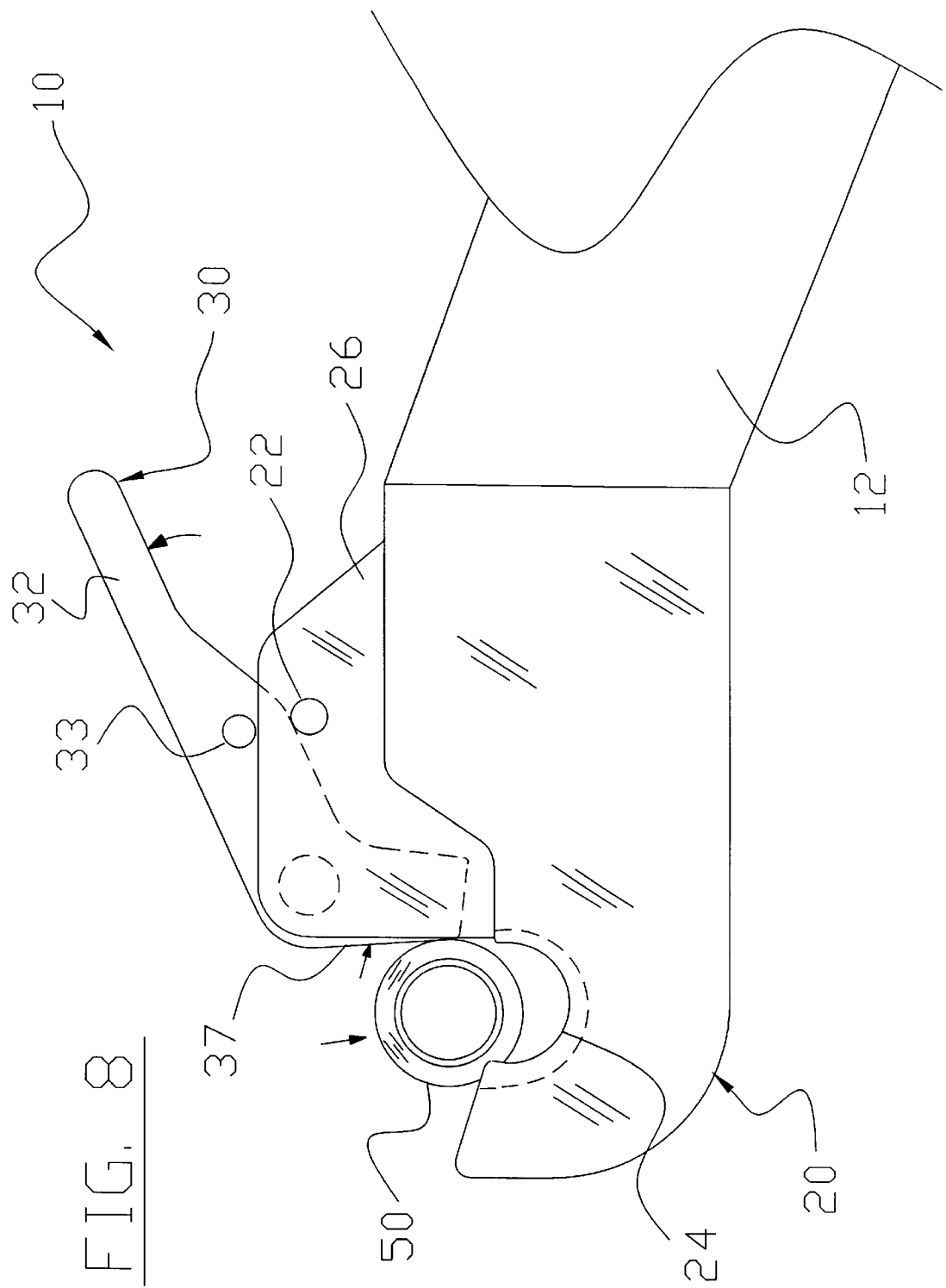
FIG. 8 is a side view of the present invention with a connecting shaft of the hitch of an implement partially inserted into the receiver groove and pushing the locking lever in a fully open position.

As best shown in FIGS. 3 through 9 of the drawings, the front edge 37 of the locking lever 30 is positioned opposite of the handle 32 and is engagable by the connecting shaft 50 (or uniball) during connection to the hitch 14 of the implement. The front edge 37 preferably is a flat structure, however various other shapes may be utilized to construct the front edge 37. The front edge 37 preferably is angled toward the front portion of the receiver groove 24 when in the fully closed position as shown in FIG. 5 of the drawings. The front edge 37 is preferably substantially vertically orientated when the connecting shaft 50 (or uniball) is being inserted into the receiver groove 24 as best shown in FIG. 8 of the drawings.

Figure 9:
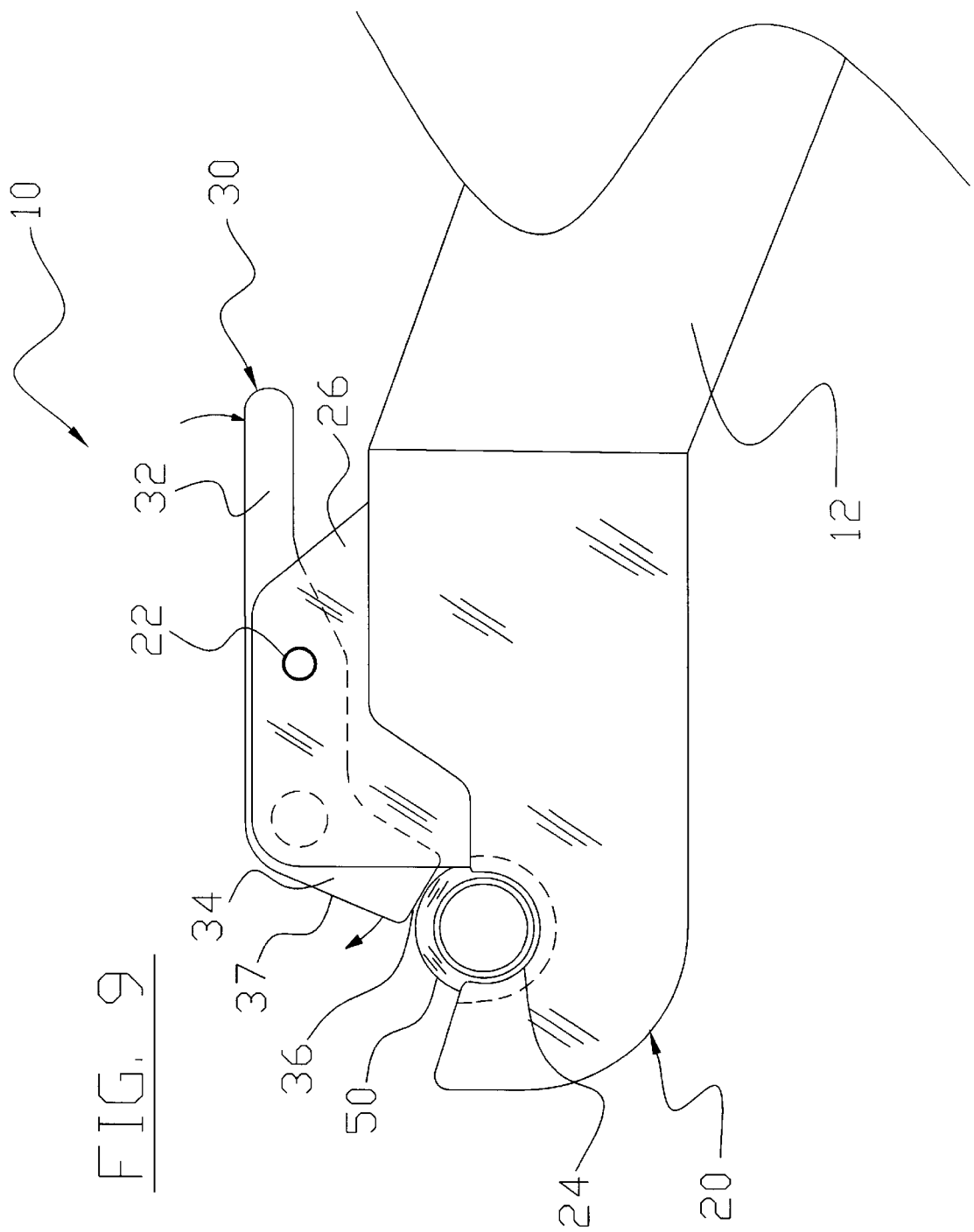
FIG. 9 is a side view of the present invention with a connecting shaft of the hitch of an implement fully inserted into the receiver groove and with the locking lever in the fully closed position to retain the connecting shaft within.
Figure 10:
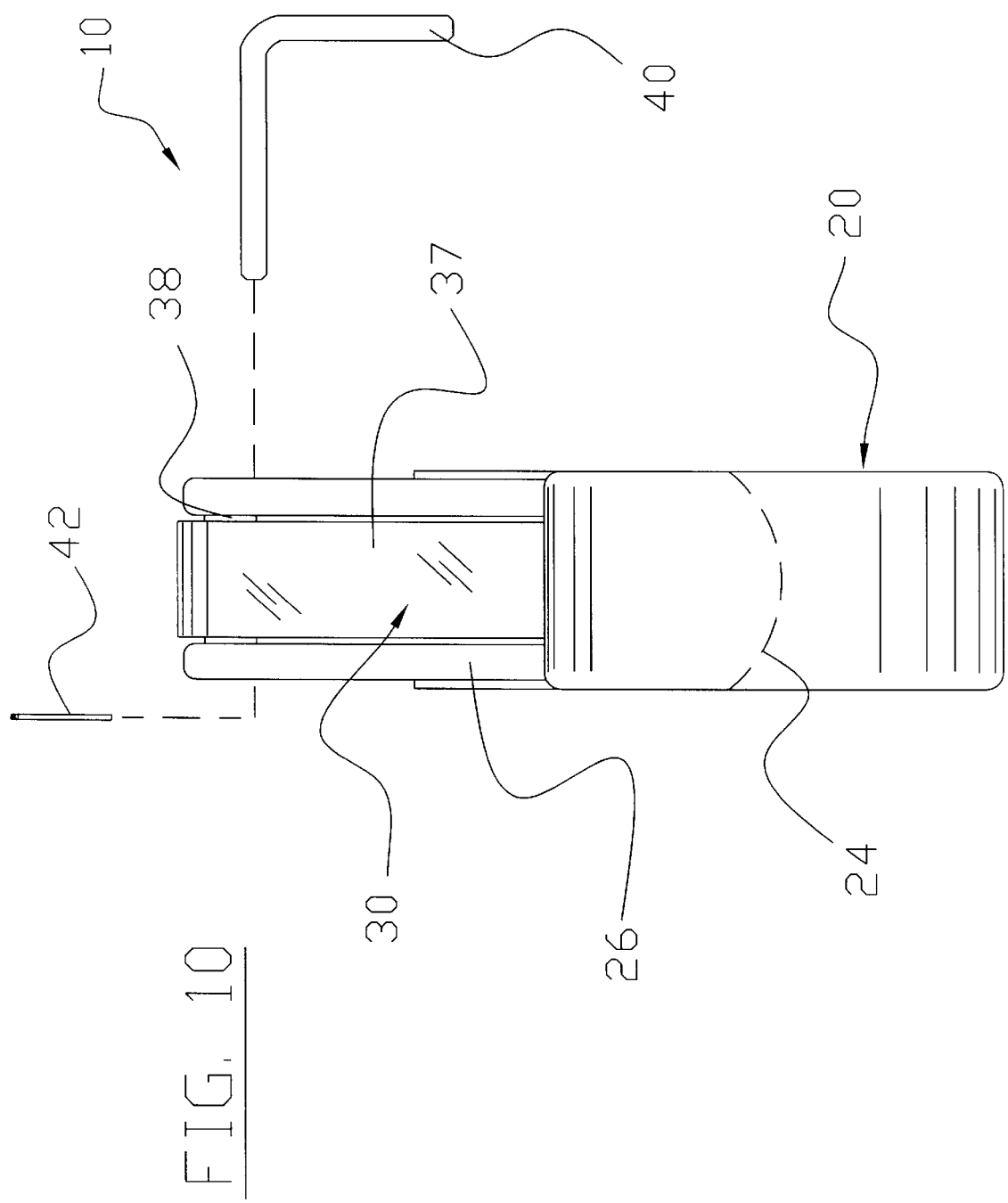
FIG. 10 is an exploded front view of the present invention.
Figure 11:
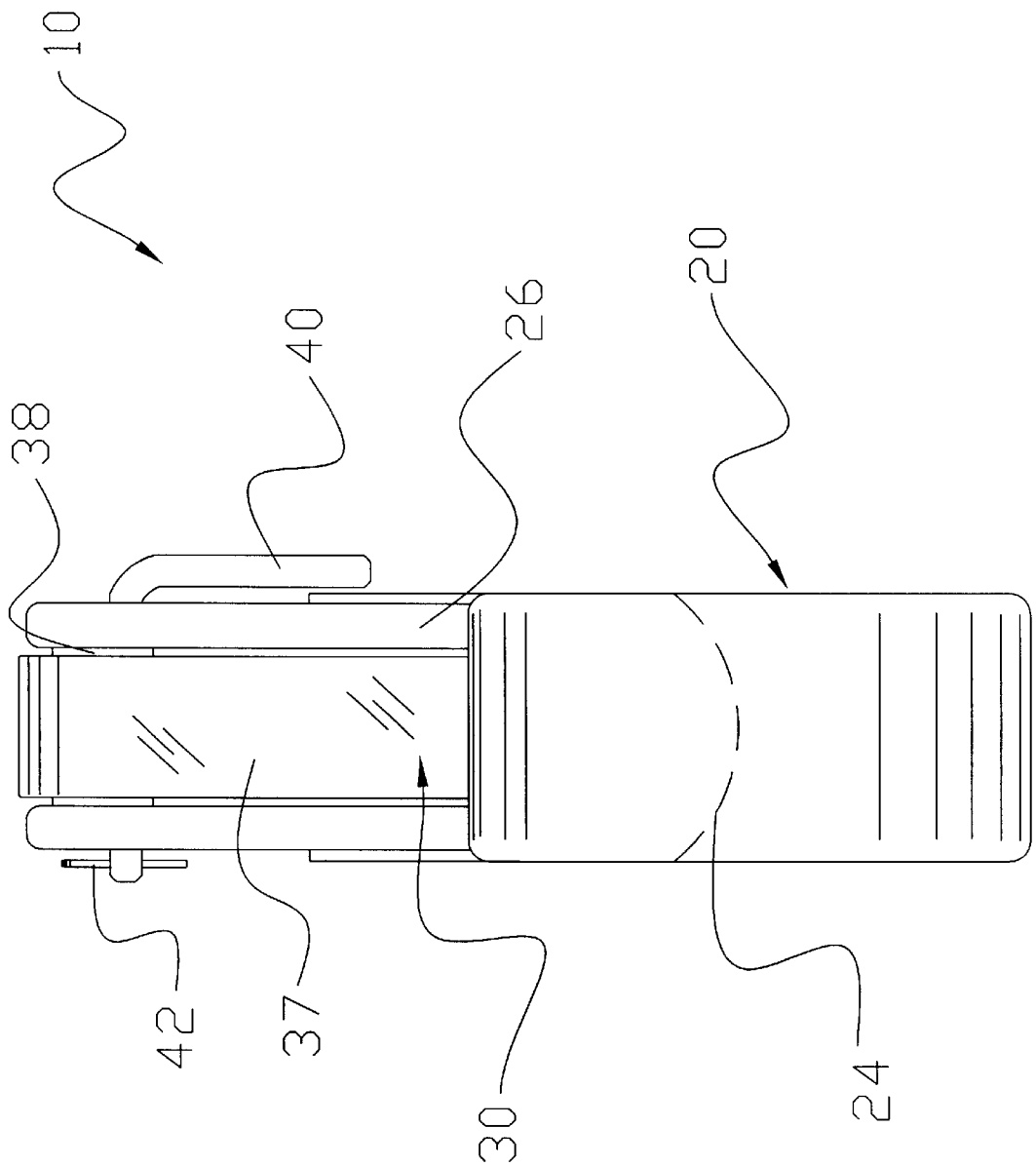
FIG. 11 is a front view of the present invention.
Figure 12:
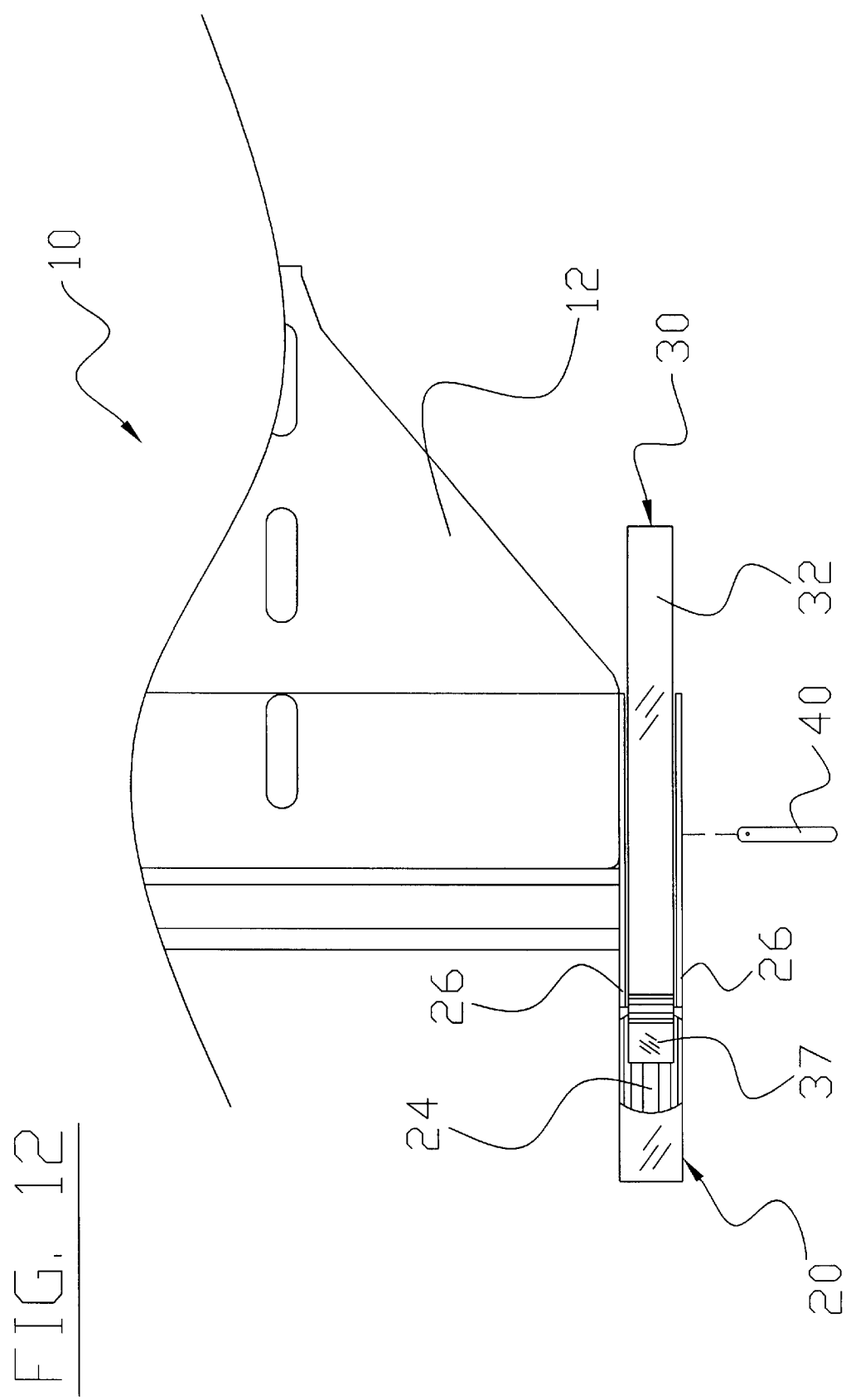
FIG. 12 is a top view of the present invention with the locking lever in the closed position.

As further shown in FIGS. 3 through 9 of the drawings, the locking edge 36 of the locking lever 30 is positioned opposite of the handle 32 and adjacent the front edge 37. The locking edge 36 is substantially orthogonal to the surface of the front edge 37 for retaining a tangential plane adjacent the connecting shaft 50 (or uniball) when the locking lever 30 is fully closed as best shown in FIG. 9 of the drawings. The locking edge 36 is preferably flat as shown in FIG. 5, however various other shapes may be utilized to construct the locking edge 36 of the locking lever 30.

As shown in FIGS. 6 and 7 of the drawings, a second aperture 33 extends through the locking lever 30 that corresponds with a first aperture 22 within the support bracket 26. The apertures 22, 33 removably receive a securing pin 40 that retains the locking lever 30 in a closed position or retaining the locking lever 30 in an open position. The securing pin 40 may be comprised of any well-known pin structure and may utilize a key 42 or other device for retaining the securing pin 40 within the apertures 22, 23.

In use, the user positions the claw member 20 directly below the connecting shaft 50 (or uniball) attached to the hitch 14 of the implement to be attached to the tractor. The user then elevates the support arms 12 or lowers the hitch 14 so that the connecting shaft 50 (or uniball) begins to engage the front surface of the locking lever 30. As the connecting shaft 50 engages the front surface of the locking lever 30, the locking lever 30 is pivoted counter-clockwise so that the body 34 of the locking lever 30 is moved away from the receiver groove 24 as best shown in FIGS. 7 and 8 of the drawings. The connecting shaft 50 is further manipulated into the receiver groove 24 until completely positioned within the receiver groove 24 as shown in FIG. 9 of the drawings. When the connecting shaft 50 (or uniball) is properly positioned within the receiver groove 24, the locking lever 30 may automatically rotate clock-wise about the support bracket 26 or the user may manipulate the handle 32 as further shown in FIG. 9 of the drawings. When the locking lever 30 is in the closed position, the locking edge 36 is positioned adjacent to and substantially tangential to the outer surface of the connecting shaft 50 (or uniball) to prevent the escape of the connecting shaft 50 from the receiver groove 24. The user preferably inserts a securing pin 40 or similar object through the apertures 22, 33 to prevent the locking lever 30 from moving from the closed position into the open position. The user then attached the upper center arm of the three-point hitch to the hitch 14 and then operates the implement in conjunction with the tractor. When the user is finished using the implement and desires to unhook the implement from the three-point hitch, the user simply removes the securing pin 40 from the apertures 22, 33 and manipulates the locking lever 30 into the open position as shown in FIG. 3 of the drawings. As shown in FIG. 4 of the drawings, the securing pin 40 is then inserted through the first aperture 22 within the support bracket 26 below the body 34 of the locking lever 30 thereby retaining the locking lever 30 in the open position as best shown in FIG. 4 of the drawings. The user is then able to lower the support arms 12 of the three-point hitch or raise the hitch 14 of the implement until the connecting shaft 50 (or uniball) is removed from the receiving groove. The user then repeats the above process for a second implement.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A connector assembly for a three-point hitch attached to a first support arm and a second support arm of said three-point hitch, said connector assembly comprises:

a claw member having a support bracket extending upwardly, wherein said support bracket is comprised of a first wall and a second wall defining a receiver channel within;

a receiver groove positioned within said claw member in front of said support bracket, wherein said receiver groove is formed for receiving a connecting member attached to a hitch of an implement;

a locking lever pivotally attached to said support bracket of said claw member within said receiver channel, wherein said locking lever has an open position for allowing said connecting member to be inserted or released within said receiver groove and a closed position for retaining said connecting member within said receiver groove; and a means for securing said locking lever within said closed position and said open position;

wherein said locking lever is comprised of:

a body pivotally attached to said claw member, wherein said body includes a front edge and a locking edge, wherein said locking edge is comprised of a straight structure; and a handle extending from said body;

wherein said means for securing is comprised of:

a first aperture extending through said claw member;

a second aperture extending through said locking lever aligned with said first aperture when said locking lever is within said closed position; and a securing pin extendable through said first aperture and said second aperture.

2. The connector assembly for a three-point hitch of claim 1, wherein said locking edge is juxtaposed to said connecting member when said locking lever is in said closed position.

3. The connector assembly for a three-point hitch of claim 1, wherein said front edge extends downwardly at an angled toward said receiver groove when said locking lever is within said closed position.

4. The connector assembly for a three-point hitch of claim 1, wherein said front edge is substantially flat.

5. The connector assembly for a three-point hitch of claim 1, wherein said locking edge is substantially flat.

6. The connector assembly for a three-point hitch of claim 1, wherein said locking edge is substantially orthogonal with respect to said front edge.

7. The connector assembly for a three-point hitch of claim 1, wherein said locking edge is adjacent said front edge.

8. A method of operating a connector assembly for a three-point hitch attached to a first support arm and a second support arm of said three-point hitch having a claw member having a receiver groove with a locking lever pivotally attached to said claw member and a means for securing said locking lever within a closed position and an open position, comprising the steps of:

(a) positioning said claw member below a connecting member of a hitch of an implement;

(b) elevating said claw member upwardly with a front edge of said locking lever engaged by said connecting member thereby rotating said locking lever into said open position;

(c) receiving said connecting member within said receiver groove of said claw member;

(d) rotating said locking lever so that a locking edge of said locking lever is juxtaposed to said connecting member for preventing removal of said connecting member from said receiver groove; and (e) inserting a securing pin within a first aperture of said claw member and a second aperture within said locking lever for retaining said locking lever in a locked position.

9. A method of operating a connector assembly for a three-point hitch attached to a first support arm and a second support arm of said three-point hitch having a claw member having a receiver groove with a locking lever pivotally attached to said claw member and a means for securing said locking lever within a closed position and an open position, comprising the steps of:

(a) rotating said locking lever so that said locking lever is removed from said receiver groove; and (b) inserting a securing pin within a first aperture of said claw member for engaging a lower edge of said locking lever for retaining said locking lever in said open position.

* * * * *